US 11,772,665 B2

(12) United States Patent
Gattu et al.

(10) Patent No.: US 11,772,665 B2
(45) Date of Patent: Oct. 3, 2023

(54) METHODS AND SYSTEM FOR DETECTING FRETTING

(71) Applicant: Ford Global Technologies, LLC, Dearborn, MI (US)

(72) Inventors: Pallavi Gattu, Dearborn, MI (US); Kristian Ulyses Flores Aviña, Mexico City (MX); Miguel Angel Leon Guerrero, Ecatepec de Morelos (MX)

(73) Assignee: Ford Global Technologies, LLC, Dearborn, MI (US)

( * ) Notice: Subject to any disclaimer, the term of this patent is extended or adjusted under 35 U.S.C. 154(b) by 230 days.

(21) Appl. No.: 17/169,070

(22) Filed: Feb. 5, 2021

(65) Prior Publication Data

US 2022/0250632 A1 Aug. 11, 2022

(51) Int. Cl.
| | |
|---|---|
| *B60W 50/02* | (2012.01) |
| *B60W 50/14* | (2020.01) |
| *B60W 10/22* | (2006.01) |
| *B60W 10/04* | (2006.01) |
| *B60W 50/04* | (2006.01) |
| *B60R 16/033* | (2006.01) |
| *B60R 16/023* | (2006.01) |
| *B60K 1/04* | (2019.01) |

(52) U.S. Cl.
CPC .......... *B60W 50/0205* (2013.01); *B60K 1/04* (2013.01); *B60R 16/0231* (2013.01); *B60R 16/033* (2013.01); *B60W 10/04* (2013.01); *B60W 10/22* (2013.01); *B60W 50/04* (2013.01); *B60W 50/14* (2013.01); *B60W 2050/041* (2013.01)

(58) Field of Classification Search
CPC .. B60W 50/0205; B60W 10/04; B60W 10/22; B60W 50/04; B60W 50/14; B60W 2050/041; B60K 1/04; B60R 16/0231; B60R 16/033

USPC .......................................................... 701/29
See application file for complete search history.

(56) References Cited

U.S. PATENT DOCUMENTS

| | | | |
|---|---|---|---|
| 3,587,318 A1 | 11/2013 | Chandler et al. | |
| 9,989,076 B2 | 6/2018 | Samad | |
| 10,328,944 B2 * | 6/2019 | Dudar ................. | F02D 41/1498 |
| 2008/0303650 A1 * | 12/2008 | Fagot-Revurat .... | B60C 23/0408 340/447 |
| 2010/0219720 A1 * | 9/2010 | Namuduri ................ | F16F 1/06 310/319 |
| 2012/0229223 A1 * | 9/2012 | Ii .............................. | H03B 5/36 331/155 |

(Continued)

OTHER PUBLICATIONS

Van Dijk, P. et al., "Contact Problems Due to Fretting and Their Solutions," AMP Journal of Technology, vol. 5, Jun. 1996, 5 pages.
Braunovic, M. et al., "Fretting in Electrical/Electronic Connections: A Review," IEICE Transaction on Electronics, vol. 92-C, No. 8, Aug. 2009, 11 pages.

(Continued)

*Primary Examiner* — Jonathan M Dager
*Assistant Examiner* — Jean W Charleston
(74) *Attorney, Agent, or Firm* — David Kelley; McCoy Russell LLP (57) ABSTRACT

Methods and systems are provided for operating a vehicle that includes a piezoelectric device. The piezoelectric device may harvest energy that may be transferred between two masses, such as a chassis and a vehicle suspension, to power electrical components of a vehicle. In addition, output of the piezoelectric device may be monitored to identify degradation of electrical connectors.

16 Claims, 7 Drawing Sheets

(56) References Cited

U.S. PATENT DOCUMENTS

| | | | | |
|---|---|---|---|---|
| 2013/0070029 | A1* | 3/2013 | Mizukami | H01L 41/319 |
| | | | | 347/68 |
| 2013/0154441 | A1* | 6/2013 | Redmond | H02N 2/181 |
| | | | | 235/492 |
| 2015/0369899 | A1* | 12/2015 | Ben Jamaa | G01R 1/07314 |
| | | | | 324/750.02 |
| 2016/0091284 | A1* | 3/2016 | Hensler | F41H 13/0031 |
| | | | | 361/232 |
| 2017/0357316 | A1* | 12/2017 | Shah | G06F 3/016 |
| 2018/0210024 | A1* | 7/2018 | Wang | H01R 13/6683 |
| 2019/0195733 | A1 | 6/2019 | Stansloski et al. | |
| 2021/0114583 | A1* | 4/2021 | Flores Aviña | G07C 5/02 |

OTHER PUBLICATIONS

Scopelliti, D., "The Pain of Fretting Corrosion," Samtec Website, Available Online at https://suddendocs.samtec.com/productspecs/fretting-corrosion.pdf, Apr. 23, 2013, 8 pages.

Zeng, W. et al., "Highly durable all-fiber nanogenerator for mechanical energy harvesting," Energy & Environmental Science, vol. 6, May 2013, 8 pages.

Xing, Y. et al., "Signal Analysis of Fretting Damages on Electrical Connector Systems," Master's of Mechanical Engineering Thesis, Blekinge Institute of Technology, Department of Mechanical Engineering, Available as Early as Jan. 2017, 100 pages.

"Fretting, fretting corrosion and fretting mechanisms," Tribonet Website, Available Online at https://www.tribonet.org/wiki/fretting-corrosion/, Oct. 28, 2018, 8 pages.

* cited by examiner

METHODS AND SYSTEM FOR DETECTING FRETTING

FIELD

The present description relates generally to methods and systems for monitoring a system for fretting of electrical connectors. The methods and systems may be particularly useful for vehicles that are electrically propelled.

BACKGROUND/SUMMARY

A vehicle may include a battery to provide electrical energy that may be applied to propel the vehicle. The battery may be comprised of a plurality of battery cells. The battery cells may be connected in series with other battery cells to increase battery output voltage. The battery cells may also be connected in parallel with other battery cells to increase output current capacity of the battery. The battery cells may be coupled to other battery cells via electrical connections. The electrical connections may include two mating surfaces (e.g., a pad and a leg). The two mating surfaces may be soldered together or there may be a friction fit between the two mating surfaces. Vibrations may cause one of the two mating surfaces to move relative to the other of the two mating surfaces. The relative motion between the two mating surfaces may cause one or both of the mating surfaces to wear and generate an oxide film (e.g. fretting). The oxide film may grow and thicken if motion between the two mating surfaces continues. The oxide film may increase and an amount of electrical resistance that is between the two mating surfaces may increase up to a point where the oxide film forms an insulator between the two mating surfaces. The connection may no longer be useful once the two mating surfaces are insulated from each other. Consequently, operation of the battery may degrade.

The inventors herein have recognized the above-mentioned issues and have developed a vehicle operating method, comprising: generating an electrical output via a piezoelectric device, the piezoelectric device coupled to a mount that insulates a first vehicle component from a second vehicle component; and indicating degradation of an electrical connector in response to the electrical output.

By monitoring output of a piezoelectric device, it may be possible to determine vehicle operating conditions that may contribute to degradation of electrical connections in a battery and/or vehicle electric power system. For example, the piezoelectric device may respond to vibrational signal frequencies and magnitudes that may be indicative of conditions that may cause degradation of electrical connectors. In particular, the piezoelectric device may output a voltage that reflects the vibrational signal frequencies and a controller may respond to output of the piezoelectric device to determine if degradation of electrical connectors may result from the vibrational frequencies. The piezoelectric devices may also operate to harvest mechanical energy between two masses and convert the harvested mechanical energy into electrical energy. The electrical energy may be used to propel the vehicle and power ancillary electrical devices.

The present description may provide several advantages. In particular, the approach may allow degradation of electrical connections to be predicted. Further, the approach generates electric power while determining whether or not vibrational energy may affect degradation of electrical connectors. In addition, the approach may provide mitigating actions when undesirable vibrations occur in a vehicle system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
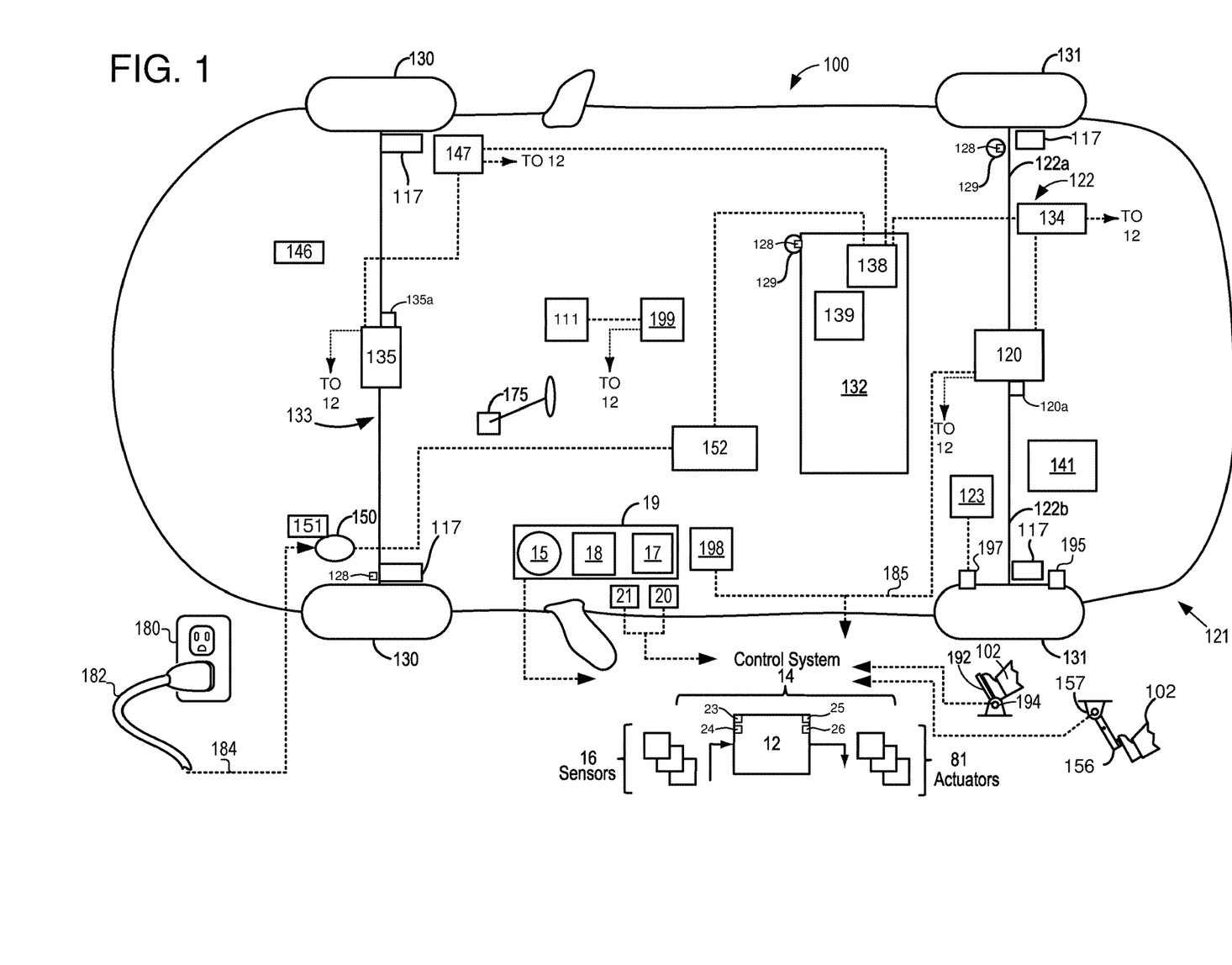
FIG. 1 is a schematic diagram of a vehicle driveline.
Figure 2:
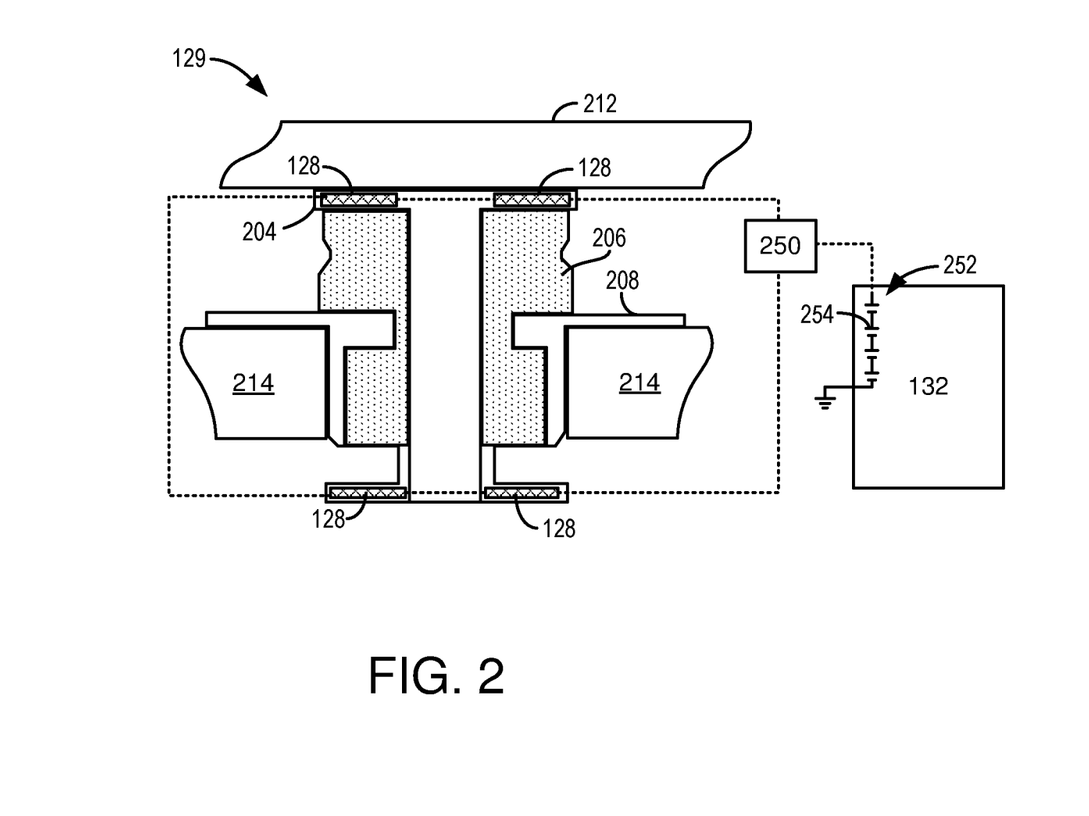
FIG. 2 is a cut-away view of a vibration insulating mount that includes piezoelectric devices.
Figure 3:
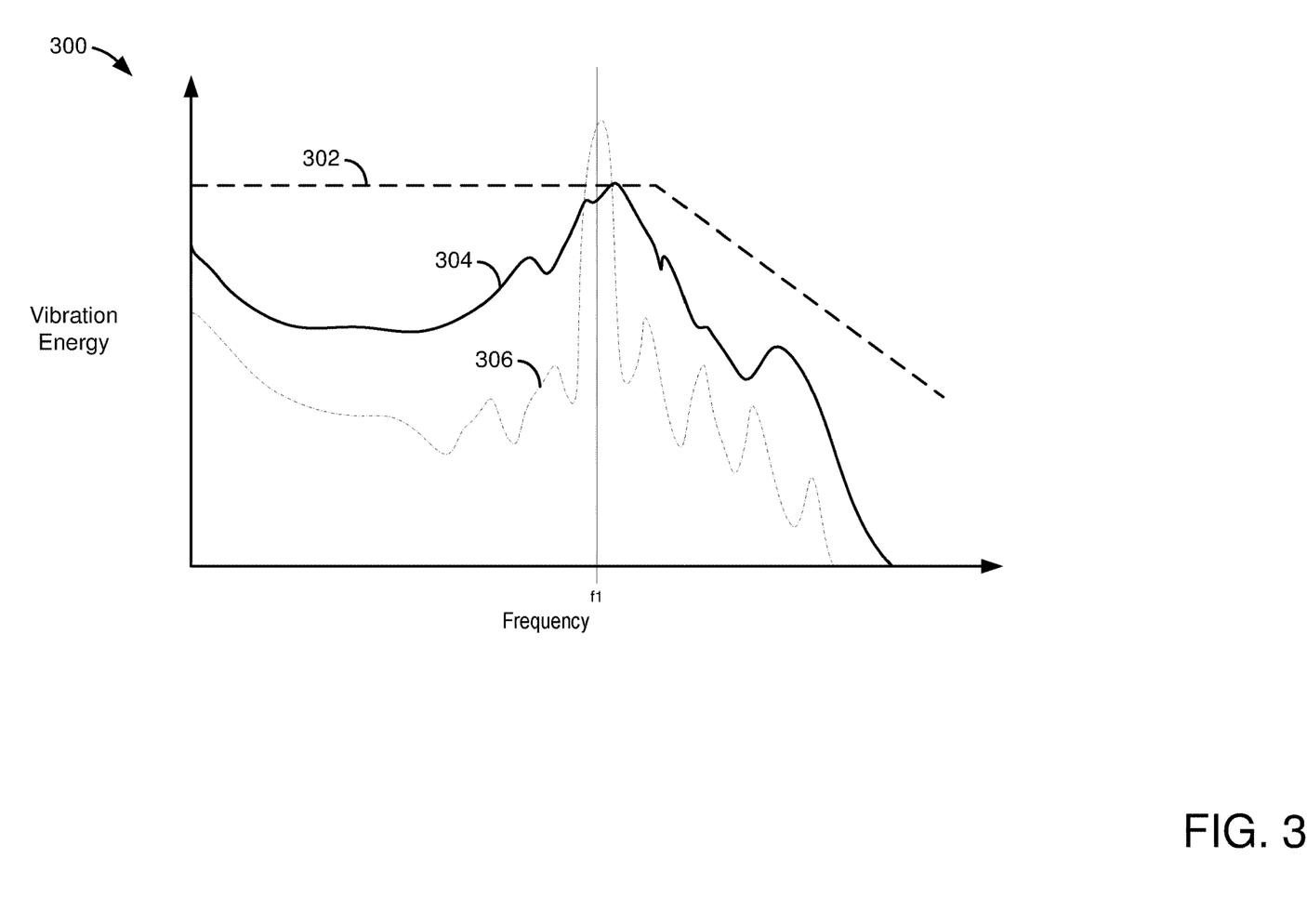
FIG. 3 is a plot that shows vibrational energy that may influence fretting of electrical connections.
Figure 4:
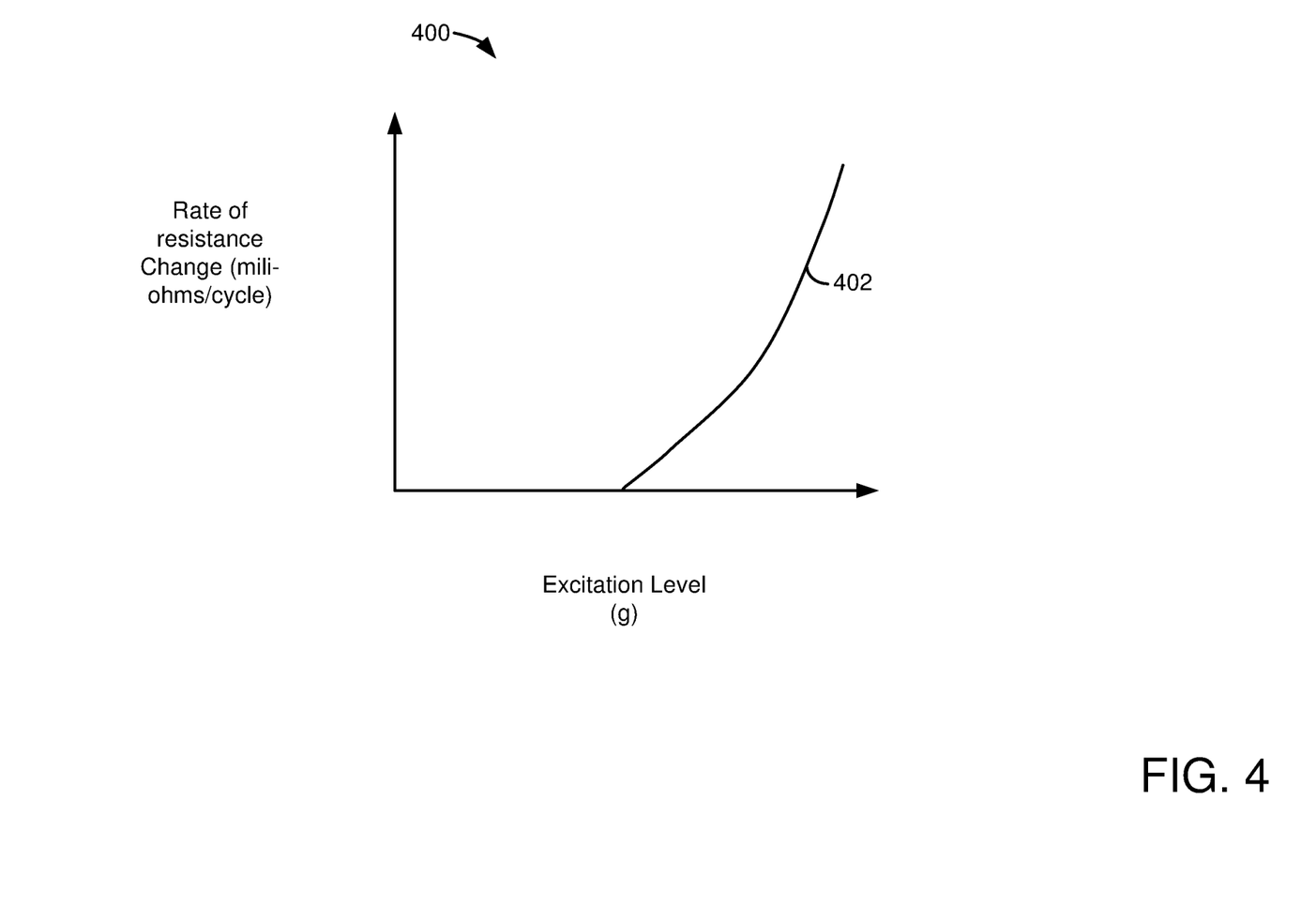
FIG. 4 is a plot that shows a relationship between excitation level and rate of resistance change for electrical connectors.
Figure 5:
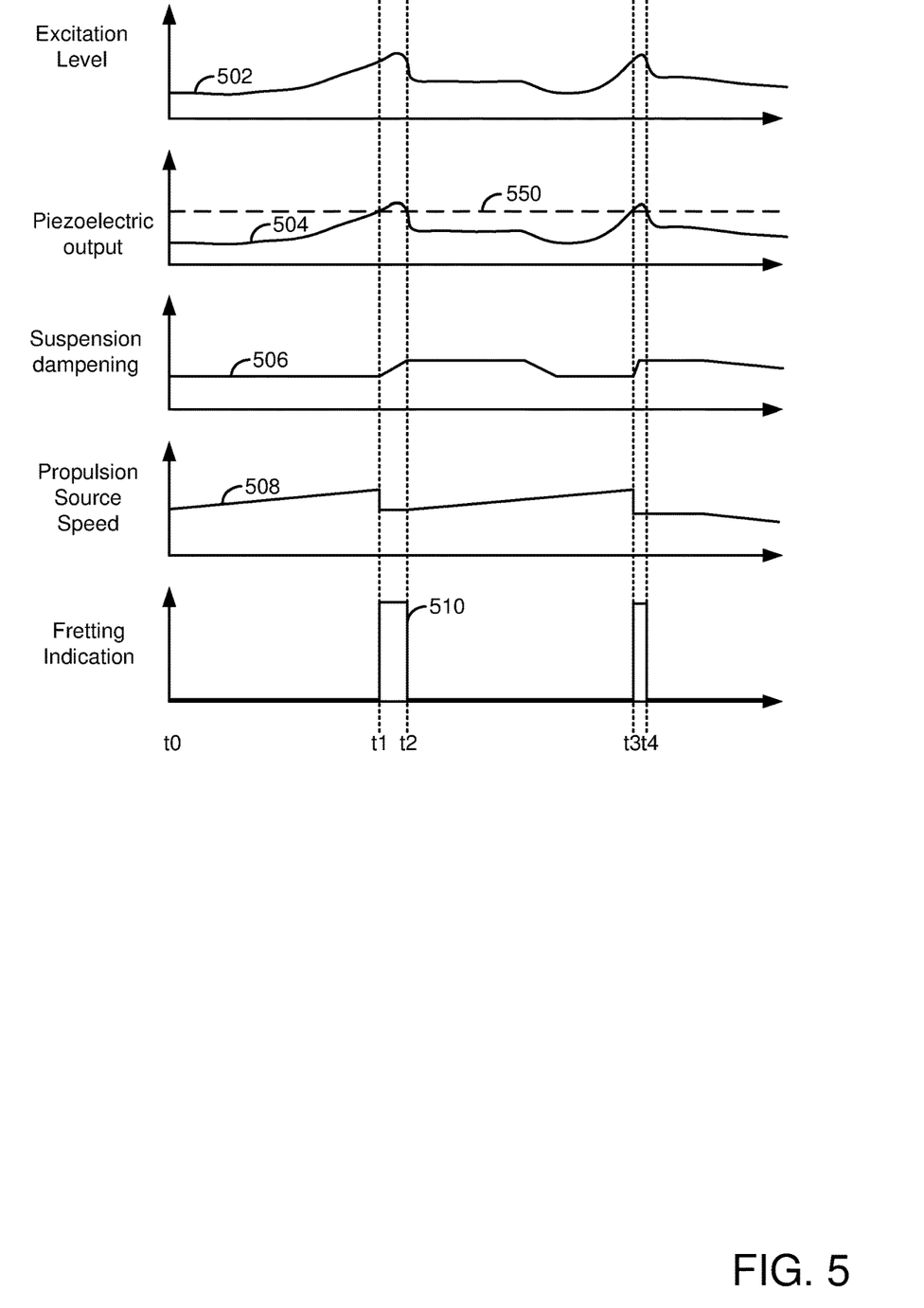
FIG. 5 is a vehicle operating sequence where output of a piezoelectric device is a basis for indicating fretting of electrical connectors.
Figure 6:
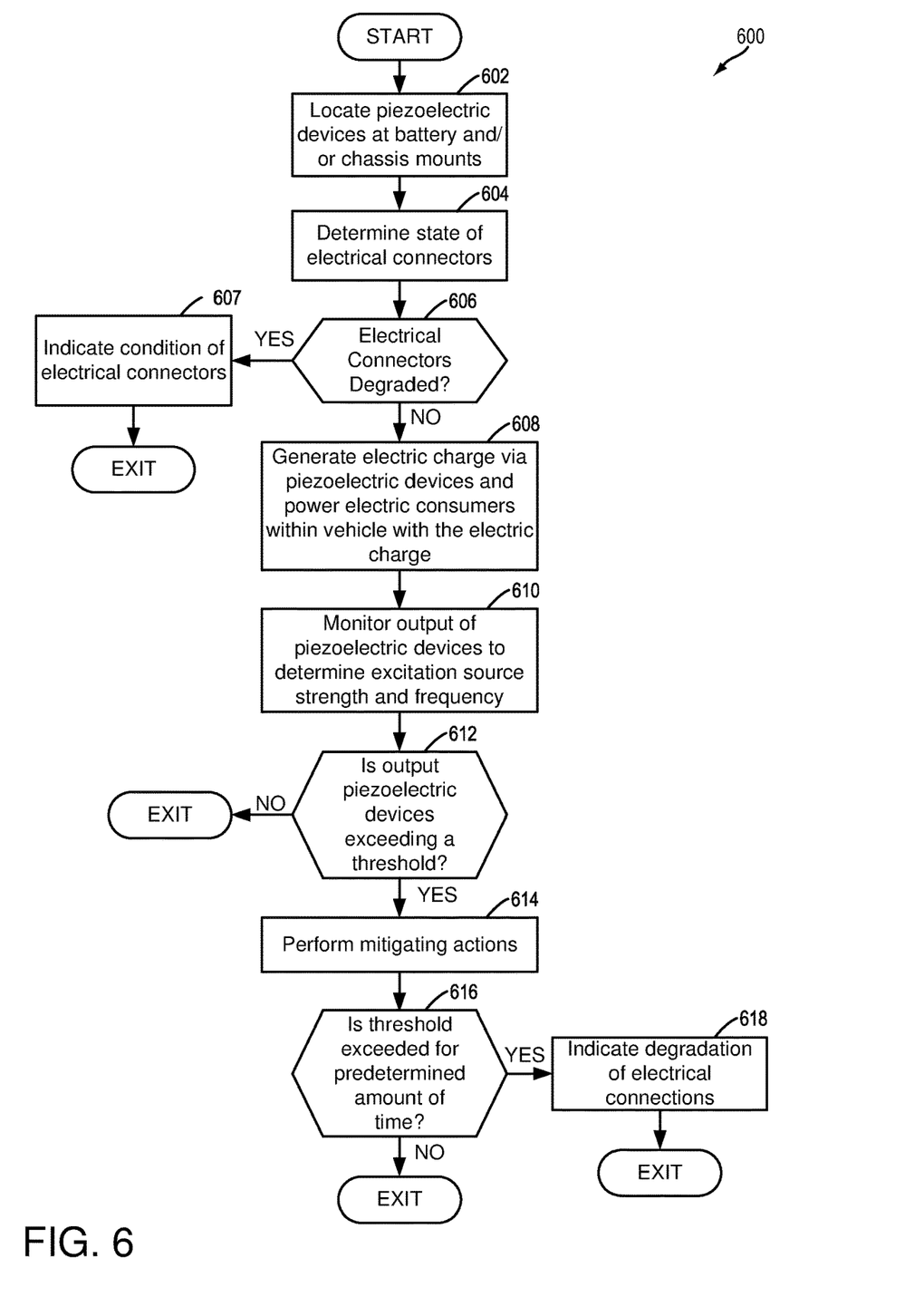
FIG. 6 is a flowchart of a method for delivering electrical power and predicting fretting of electrical connections via a piezoelectric device.
Figure 7A:
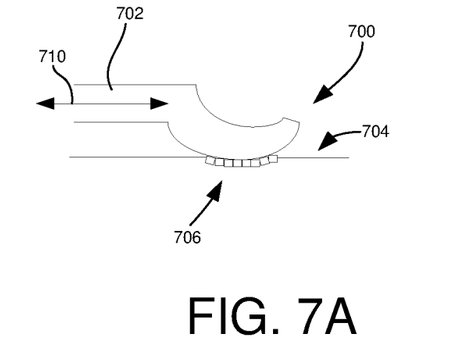
FIGS. 7A and 7B show an example electrical connection between two electrical devices.
Figure 7B:
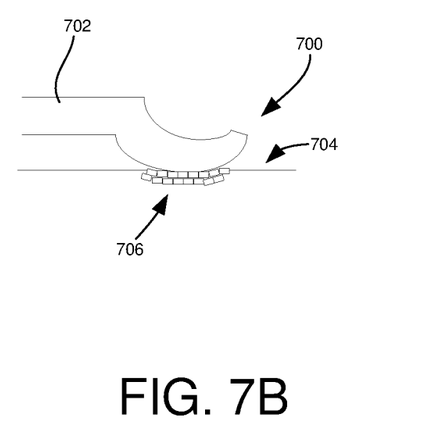

The following description relates to systems and methods for operating a vehicle that includes one or more piezoelectric devices. FIG. 1 shows an example vehicle system that includes a driveline with one or more electrical propulsion sources. The electrical propulsion sources may be operated with electrical energy that is generated via the one or more piezoelectric devices. A detailed view of a mounting device that includes piezoelectric devices is shown in FIG. 2. The mounting device may provide insulation from vibrations transferred from a first mass to a second mass. FIG. 3 shows example output characteristics for piezoelectric devices for a vehicle at different mileage levels. FIG. 4 shows a relationship between an excitation level of an electrical connection and a rate of resistance change for the electrical connection. An example vehicle operating sequence according to the present invention is shown in FIG. 5. A method for operating a vehicle that includes piezoelectric devices is shown in FIG. 6. An example electrical connection between two electrical devices is shown in FIGS. 7A and 7B.

FIG. 1 illustrates an example vehicle propulsion system 100 for vehicle 121. Throughout the description of FIG. 1, mechanical connections between various components are illustrated as solid lines, whereas electrical connections between various components are illustrated as dashed lines. Vehicle propulsion system 100 is shown with a first electric machine (e.g., a propulsive force electric machine) 120 and a second electric machine (e.g., a propulsive force electric machine) 135 for propelling vehicle 121. However, in other examples, vehicle 121 may include only one electrical machine for providing propulsive force. Electric machine 120 and electric machine 135 are controlled via controller 12. The controller 12 receives signals from the various sensors shown in FIG. 1. In addition, controller 12 employs the actuators shown in FIG. 1 to adjust driveline operation based on the received signals and instructions stored in memory of controller 12. In some examples, the vehicle propulsion system 100 may include an internal combustion engine (not shown). Controller 12 includes a central processor 23, read only (non-transitory) memory 24, random access memory 25, and inputs and outputs 26.

Vehicle propulsion system 100 has a front axle 133 and a rear axle 122. In some examples, rear axle may comprise two half shafts, for example first half shaft 122*a*, and second half shaft 122*b*. Vehicle propulsion system 100 further includes front wheels 130 and rear wheels 131. In this example, front wheels 130 and/or rear wheels 131 may be driven via electrical propulsion sources. The rear axle 122 is coupled to electric machine 120. Electric machine 120 is shown incorporated into axle 122 and electric machine 135 is shown incorporated into front axle 133. Rear axle 122 may include a transmission or gearbox 120*a* that shifts from a first gear to a second gear or vice-versa. Likewise, front axle 133 may include a transmission or gearbox 135*a* that shifts from a first gear to a second gear or vice-versa.

Electric machines 120 and 135 may receive electrical power from onboard electrical energy storage device 132. Furthermore, electric machines 120 and 135 may provide a generator function to convert the vehicle's kinetic energy into electrical energy, where the electrical energy may be stored at electric energy storage device 132 for later use by the electric machine 120 and/or 135. A first inverter system controller (ISC1) 134 may convert alternating current generated by electric machine 120 to direct current for storage at the electric energy storage device 132 and vice versa. A second inverter system controller (ISC2) 147 may convert alternating current generated by electric machine 135 to direct current for storage at the electric energy storage device 132 and vice versa. Electric energy storage device 132 may be a battery, capacitor, inductor, or other electric energy storage device. Electric energy storage device 132 may be insulated from vibrations in the vehicle chassis via mounts 129 that include piezoelectric devices 128. Similarly, the vehicle's chassis may be insulated from suspension vibrations via mounts 129 that include piezoelectric devices 128. Note that the chassis mounts may be different from the electric energy storage device mounts.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 120, energy storage device 132, electric machine 135, etc. Control system 14 may receive sensory feedback information from one or more of electric machine 135, electric machine 120, energy storage device 132, etc. Further, control system 14 may send control signals to one or more of electric machine 135, electric machine 120, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to a propulsive effort pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in electric vehicle, whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 and electric machine 135 may propel the vehicle by utilizing a stationary electric power source.

Electric energy storage device 132 includes an electric energy storage device controller 139. Electric energy storage device controller 139 may provide charge balancing between energy storage element (e.g., battery cells) and communication with other vehicle controllers (e.g., controller 12).

Vehicle propulsion system 100 may also include an ambient temperature/humidity sensor 198. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. In another example, the control system may adjust an active suspension system 111 responsive to input from inertial sensors 199 and piezoelectric devices. The active suspension system may include adjustable dampeners 117 to actively control suspension dampening. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1 shows a tire pressure sensor 197 coupled to wheel 131 and configured to monitor a pressure in a tire of wheel 131. While not explicitly illustrated, it may be understood that each of the four tires indicated in FIG. 1 may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a motor electronics coolant pump (MECP) 146. MECP 146 may be used to circulate coolant to diffuse heat generated by at least electric machine 120 and electric machine 135 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, piezoelectric devices 128, ambient temperature/humidity sensor 198, inertial sensors 199, etc. In some examples, steering angle sensor 175, sensors associated with electric machine 135 and electric machine 120, etc., may communicate information to controller 12, regarding various states of electric machine operation.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 135 and electric machine 120) based on an operator input. Various examples of the operator ignition interface 15 may include interfaces that require a physical apparatus, such as an active key, that may be inserted into the operator ignition interface 15 to start the electric machines 135 and 120 to turn on the vehicle, or may be removed to shut down the electric machines 125 and 12 to turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the electric machines.

Thus, the system of FIG. 1 provides for a vehicle system, comprising: a vibration insulating mount including one or more piezoelectric devices; a first mass coupled to the vibration insulating mount; a second mass coupled to the vibration insulating mount; and a controller including executable instructions stored in non-transitory memory that cause the controller to indicate degradation of an electrical connector in response to a voltage output of the one or more piezoelectric devices. The vehicle system further comprises additional instructions to adjust operation of a vehicle to reduce fretting of the electrical connector in response to a frequency and magnitude of the voltage output of the one or more piezoelectric devices. The vehicle system includes where adjusting operation of the vehicle to reduce fretting includes adjusting dampening of a vehicle suspension. The vehicle system includes where adjusting operation of the vehicle to reduce fretting includes adjusting a frequency of rotation of a propulsive effort source. The vehicle system includes where the first mass is a battery and the second mass is a vehicle chassis or suspension. The vehicle system includes where the first mass is a vehicle chassis and the second mass is a vehicle suspension. The vehicle system further comprises circuitry to interface the one or more piezoelectric devices to a battery. The vehicle system includes where the battery supplies power to propel a vehicle.

Referring now to FIG. 2, an example mount with vibration insulation is shown. Mount 129 includes a first flange 204 for coupling to first mass 212. First flange 204 may be constructed of a metal, polymer, or other suitable material. The first mass 212 may be a vehicle chassis, battery housing, or other device that is desired to be insulated from vibrations that may occur in a vehicle. Piezoelectric devices 128 may be mechanically coupled to first flange 204 to receive vibrational energy that may be transmitted between second mass 214 and first mass 212.

Mount 129 includes a second flange 208 for coupling to second mass 214. The second flange 208 may also be constructed of a metal, polymer, or other suitable material. The second mass 214 may be a vehicle suspension or other device that is desired to be insulated from vibrations that may occur in a vehicle. Piezoelectric devices 128 may be mechanically coupled to second flange 214 to receive vibrational energy that may be transmitted between second mass 214 and first mass 212.

Mount 129 may also include a dampener 206 to insulate transfer of vibrations from the second mass 214 to the first mass 212, or vice-versa. In one example, dampener 206 may be constructed of rubber or other suitable dampening material.

Piezoelectric devices 128 are electrically coupled to electric energy storage device 132. Electric energy storage device 132 may supply power to propel a vehicle and operate ancillary devices in a vehicle (e.g., audio system, displays, heater, windshield wipers, etc.). Interface circuitry 250 allows piezoelectric devices 128 to be coupled to electric energy storage device 132. In some examples, interface circuitry 250 may include inductors and switching components that boost voltage output by piezoelectric devices to supply electric charge to electric energy storage device 132. In examples where electric energy storage device 132 is a battery, interface circuitry 250 may allow piezoelectric devices 128 to supply electric charge to one row of cells 254 so that boosting output of the piezoelectric device may not be necessary. The one row of cells may be electrically coupled with other cells in series as shown at 252 to increase a voltage of electric energy storage device 132.

It should be appreciated that mount 129 is a non-limiting example of a mount and that piezoelectric devices may be coupled to a wide range of mounts to provide insulation from vibrations in a vehicle. In addition, vehicle suspension components (e.g., shock absorbers) may also include piezoelectric devices to harvest energy in the vehicle's suspension and to provide data for evaluating electrical connections.

Referring now to FIG. 3, a plot of vibrational energy in a vehicle component versus frequency of the vibrational energy is shown. The vertical axis represents vibrational energy and the amount of vibrational energy increases in the direction of the vertical axis arrow. The horizontal axis represents frequency of the vibrational energy and the frequency increases from the left side of plot 300 to the right side of plot 300.

Dashed line 302 represents a threshold vibrational energy amount that is not desired to be exceeded. The level of dashed line 302 may be determined via monitoring fretting of electrical connectors and determining what vibrational energy levels increase fretting to undesirable levels. Trace 304 represents vibrational energy that may be observed in a mount for a new vehicle. Trace 306 represents vibrational energy that may be observed in the mount after the vehicle has traveled a predetermined distance (e.g., 50,000 kilometers).

It may be observed that the amount of vibrational energy in curve 306 exceeds threshold 302 at frequency f1. Therefore, it may be determined that vibrations at frequency f1 may lead to degradation of electrical connections since threshold 302 may be exceeded at frequency f1. For example, if a piezoelectric device is outputting a voltage at frequency f1 and a voltage that indicates energy level 302 is exceeded for longer than a predetermined amount of time, then it may be judged that electrical connections may be degraded.

Referring now to FIG. 4, a plot that illustrates a relationship between an excitation level (e.g., an amount of vibrational energy transmitted between components) and a rate of resistance change in an electrical connector is shown. The vertical axis represents a rate of resistance change and the rate of resistance change increases in the direction of the vertical axis arrow. The horizontal axis represents excitation level and the excitation level increases in the direction of the horizontal axis arrow.

Trace 402 represents a relationship between excitation level and rate of resistance change. Thus, as the excitation level increases beyond a threshold level, the rate of resistance change increases significantly. Therefore, if an excitation level is exceeded, a rate of resistance may increase so that an electrical connection may no longer function to allow transfer of electrical signals and power from a first electrical device to a second electrical device. As such, it may be desirable to be able to determine vibrational excitation levels that may be delivered to electrical connections.

Referring now to FIG. 5, an example vehicle operating sequence according to the method of FIG. 6 is shown. The sequence of FIG. 5 may be generated via the system of FIG. 1 in cooperation with the method of FIG. 6. The plots are aligned in time and occur at a same time. The vertical lines at t0-t4 indicate times of particular interest in the sequence.

The first plot from the top of FIG. 5 is a plot of a vibration excitation level observed at a mount, where the mount is positioned between a battery and a vehicle chassis, versus time. The vertical axis represents an amount of a vibrational excitation level and the vibrational excitation level increases in the direction of the vertical axis arrow. The horizontal axis represents time and time increases from the left side of the figure to the right side of the figure. Trace 502 represents a vibrational excitation level.

The second plot from the top of FIG. 5 is a plot of a piezoelectric device output (e.g., power or voltage) versus time. The vertical axis represents an amount of piezoelectric device output and the amount of piezoelectric output increases in the direction of the vertical axis arrow. The horizontal axis represents time and time increases from the left side of the figure to the right side of the figure. Trace 504 represents output of a piezoelectric device. Horizontal line 550 represents a threshold level above which degradation of electrical connectors may occur.

The third plot from the top of FIG. 5 is a plot of an amount of vehicle suspension dampening versus time. The vertical axis represents an amount of vehicle suspension dampening and the suspension dampening amount increases in the direction of the vertical axis arrow. The horizontal axis represents time and time increases from the left side of the figure to the right side of the figure. Trace 506 represents a suspension dampening amount.

The fourth plot from the top of FIG. 5 is a plot of an amount of propulsion source speed versus time. The vertical axis represents a propulsion source speed and the propulsion source speed increases in the direction of the vertical axis arrow. The horizontal axis represents time and time increases from the left side of the figure to the right side of the figure. Trace 508 represents the propulsion source speed.

The fifth plot from the top of FIG. 5 is a plot of a fretting indication versus time. The vertical axis represents a fretting indication state and fretting is indicated when trace 510 is near the level of the vertical axis arrow. Fretting is not indicated when trace 510 is near the horizontal axis. The horizontal axis represents time and time increases from the left side of the figure to the right side of the figure. Trace 510 represents the fretting state.

At time t0, the excitation level is medium and the piezoelectric device output is at a medium level. The suspension dampening level is also medium and the propulsion source speed is increasing. Fretting is not indicated.

At time t1, the output of the piezoelectric device exceeds threshold 550 so it may be determined that electrical connection degradation is occurring according to output of the piezoelectric device, which may correlate to levels of vibration that are observed via the piezoelectric device. The output of the piezoelectric device may be indicative of a level of vibrations that are delivered to a battery or electric energy storage device via the vehicle's suspension, chassis, and mounts. Fretting is indicated and the dampening of the vehicle's suspension is adjusted (e.g., increased) to reduce vibrations that may be imparted to electrical devices and electrical connections. Fretting may be indicated via a human/machine interface of via a display. In addition, a speed of the propulsion source may be adjusted via shifting a transmission, for example. The speed may be adjusted to a lower speed so as to move frequency content of vibrations that may be due to the propulsion source, which may help to reduce a magnitude of vibrations that may be imparted to electrical connections. The excitation level is high.

At time t2, the output of the piezoelectric device falls below threshold 550 so the indication of fretting is removed. The suspension dampening continues on at a higher level and the propulsion source speed is less than the propulsion source speed at time t1. The excitation level is lowered.

At time t3, the output of the piezoelectric device exceeds threshold 550 for a second time so it may be determined again that electrical connection degradation is occurring according to output of the piezoelectric device. Fretting is indicated and the dampening of the vehicle's suspension is increased to reduce vibrations that may be imparted to electrical devices and electrical connections. In addition, a speed of the propulsion source may be adjusted via shifting a transmission, for example. The speed may be adjusted to a lower speed so as to move frequency content of vibrations that may be due to the propulsion source, which may help to reduce a magnitude of vibrations that may be imparted to electrical connections. The excitation level is high.

At time t4, the output of the piezoelectric device falls below threshold 550 so the indication of fretting is removed again. The suspension dampening continues on at a higher level and the propulsion source speed is less than the propulsion source speed at time t3. The excitation level is lowered.

In this way, output of a piezoelectric device may be monitored for the purpose of determining the presence or absence of vibrations that may cause degradation of electrical connections. In addition, mitigating actions, such as adjusting dampening of a vehicle suspension, may be taken to reduce the possibility of causing further degradation of electrical connections.

Referring now to FIG. 6, an example method for harvesting energy in a vehicle and predicting degradation of electrical connectors is shown. The method of FIG. 6 may be incorporated into and may cooperate with the system of FIG. 1. Further, at least portions of the method of FIG. 6 may be incorporated as executable instructions stored in non-transitory memory while other portions of the method may be performed via a controller 12 transforming operating states of devices and actuators in the physical world. In other examples, the method of FIG. 6 may be performed via a controller that is included with a mount or in one controller of a distributed control system.

At 602, method 600 locates one or more piezoelectric devices on or near mounts. The mounts may be electric energy storage device mounts, chassis mounts, or other mounts. The piezoelectric devices may be located such that vibration of a vehicle chassis, suspension, or electric energy storage device compresses and decompresses the piezoelectric devices. Method 600 proceeds to 604.

At 604, method 600 determines states of one or more electrical connectors. The electrical connectors may connect electrical components to allow electrical current and/or voltage to be transferred from one electrical device to another electrical device. In one example, method 600 may output a voltage or current that is to be transferred via an electrical connector. If method 600 judges that the voltage or current has been transferred via the electrical connector, method 600 may judge that the electrical connectors are not degraded. On the other hand, if the voltage or current has not been transferred as expected, method 600 may judge that the electrical connectors may be degraded. Method 600 may apply a voltage and/or current to an electrical connector via a power source and a switch or other device to assess the state of the one or more electrical connectors. Method 600 proceeds to 606.

At 606, method 600 judges whether or not the electrical connectors are degraded. For example, if the electrical connector does not transfer a voltage or current from a first electrical device to a second electrical device, method 600 may judge that the electrical connectors are degraded. If the electrical connector does transfer the voltage or current, method 600 may judge that the electrical connectors are not degraded. If method 600 judges that the electrical connectors are degraded, the answer is yes and method 600 proceeds to 607. Otherwise, the answer is no and method 600 proceeds to 608.

At 607, method 600 indicates that electrical connections are degraded. The degradation may be due to a broken connection or other condition. Method 600 may indicate degradation of electrical connections to a vehicle operator via a human/machine interface. Alternatively, the indication may be provided to other vehicle systems so that a condition of degradation may be known by vehicle controllers. Method 600 proceeds to exit.

At 608, method 600 generates charge by compressing and decompressing the piezoelectric devices of the vehicle. The piezoelectric devices may be compressed and decompressed via energy being transferred from a vehicle's suspension to a chassis or mounts. The charge that is generated via the piezoelectric devices may be stored in an electric energy storage device. Further, the charge that is generated via the piezoelectric devices may power a vehicle propulsion source (e.g., motor), displays, windshield wipers, audio/visual devices, and communications equipment within the vehicle. In one example, the piezoelectric devices may be incorporated into mounts as shown in FIG. 2. Method 600 proceeds to 610.

At 610, method 600 monitors output of the piezoelectric devices. In one example, method 600 may monitor a frequency and magnitude of an output voltage of piezoelectric devices. Frequency content in the output voltage of the piezoelectric device may be determined by processing the voltage via a Fourier transform. Method 600 proceeds to 612.

At 612, method 600 judges if output of the piezoelectric devices exceeds a threshold magnitude or level at predetermined frequencies. In one example, method 600 may compare the voltage output of one or more piezoelectric devices to a predetermined threshold that may be indicative of fretting of electrical connectors. The predetermined threshold may be a function of frequency as shown in FIG. 3. In addition, the predetermined threshold level may be determined via supplying various vibrations to electrical connectors and measuring fretting via resistance between surfaces of the electrical connectors. If method 600 judges that output of the piezoelectric device does not exceed the threshold, the answer is no and method 600 proceeds to exit. Otherwise, the answer is yes and method 600 proceeds to 614.

At 614, method 600 may perform mitigating actions to reduce a possibility of electrical connector degradation. In one example, method 600 may adjust a dampening rate of a vehicle's suspension to change a frequency and magnitude of excitation that reaches electrical connectors of a device. In another example, method 600 may adjust a rotational speed of an electrical propulsion device to change a frequency and magnitude of excitation that reaches electrical connectors of the device. For example, method 600 may shift gears of a transmission or gearbox to change an operating frequency of an electrical propulsion device. Method 600 proceeds to 616.

At 616, method 600 judges if the threshold mentioned at 612 has been exceeded for a predetermined amount of time. The predetermined amount of time may be an amount of time that it is predicted to take to cause degradation of electrical connections via vibrational energy. Time may be accumulated each time the threshold is exceeded to determine if the threshold mentioned at 612 has been exceeded for more than the predetermined amount of time. If method 600 judges that the threshold has been exceeded longer than the predetermined amount of time, the answer is yes and method 600 proceeds to 618. Otherwise, the answer is no and method 600 exits.

At 618, method 600 indicates degradation of one or more electrical connections. Method 600 may indicate the degradation via a human/machine interface, an audible alarm, or other known indicating device. Method 600 proceeds to exit.

In this way, piezoelectric devices may harvest free energy in a vehicle and convert the free energy into electrical power to propel the vehicle. In addition, output of the piezoelectric devices may be monitored to predict degradation of one or more electrical connectors.

The method of FIG. 6 provides for a vehicle operating method, comprising: generating an electrical output via a piezoelectric device, the piezoelectric device coupled to a mount that insulates a first vehicle component from a second vehicle component; and indicating degradation of an electrical connector in response to the electrical output. The method includes where the indication is provided via a human/machine interface. The method further comprises performing mitigating actions to reduce the electrical output of the piezoelectric device when the electrical output of the piezoelectric device exceeds a threshold at a predetermined frequency. The method includes where performing mitigating actions includes adjusting dampening of a vehicle suspension. The method includes where performing mitigating actions includes adjusting a rotational frequency of a device that provides propulsive effort to a vehicle. The method includes where degradation of the electrical connector is determined via an amplitude and frequency of the electrical output of the piezoelectric device. The method includes where the electrical output is a voltage.

The method of FIG. 6 also provides for a vehicle operating method, comprising: supplying electric power from a piezoelectric device that is coupled to a first mass, the first mass insulated from a second mass; and operating one or more electric devices including a propulsion source with at least a portion of electric power supplied from the piezoelectric device. The method further comprises indicating degradation of an electrical connector associated with the first mass in response to an electrical output of the piezoelectric device. The method includes where the first mass is a battery and where the second mass is a vehicle suspension or chassis. The method includes where the first mass is a vehicle chassis and where the second mass is a vehicle suspension. The method further comprises performing mitigating actions to reduce an electrical output of the piezoelectric device when the electrical output of the piezoelectric device exceeds a threshold at a predetermined frequency.

Referring now to FIGS. 7A and 7B, an example electrical connector 700 is shown. In this example, electrical connector 700 is comprised of a leg 702 and a pad 704. Electrical energy may be transferred from the leg 702 to the pad 704 or vice-versa.

In FIG. 7A, a thin oxide film 706 exists between leg 702 and pad 704. Since the oxide film 706 is thin, the electrical connector 700 may transfer electrical energy efficiently. The leg may tend to move relative to the pad 704 as indicated by arrow 710 when vibrational energy or excitation is imparted to an electrical device that is connected to the leg 702 or to the pad 704. Leg 702 and pad 704 may transfer electrical energy from electrical connector 700 to electrical devices such as battery cells, integrated circuits, power distribution busses, and other electrical components.

In FIG. 7B, a thicker oxide film 706 exists between leg 702 and pad 704. Since the oxide film 706 is thicker, the electrical connector 700 may not transfer electrical energy efficiently. The oxide film 706 may thicken due to movement between leg 702 and pad 704. The method of FIG. 6 may predict thickening of oxide film 706 by comparing output of a piezoelectric device to a threshold level where degradation of the electrical connector may be expected to occur.

Note that the example control and estimation routines included herein can be used with various vehicle and powertrain configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to induction electric machines and permanent magnet electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:
generating an electrical output via a piezoelectric device, the piezoelectric device coupled to a mount that insulates a first vehicle component from a second vehicle component;
indicating degradation of an electrical connector in response to the electrical output; and
performing mitigating actions including reducing the electrical output of the piezoelectric device when the electrical output of the piezoelectric device exceeds a threshold and adjusting dampening of a vehicle suspension.

2. The method of claim 1, where the indication is provided via a human/machine interface.

3. The method of claim 1, where performing mitigating actions includes adjusting a rotational frequency of a device that provides propulsive effort to a vehicle.

4. The method of claim 1, where degradation of the electrical connector is determined via an amplitude and frequency of the electrical output of the piezoelectric device.

5. The method of claim 4, where the electrical output is a voltage.

6. A vehicle system, comprising:
a vibration insulating mount including one or more piezoelectric devices;
a first mass coupled to the vibration insulating mount;
a second mass coupled to the vibration insulating mount;
a controller including executable instructions stored in non-transitory memory that cause the controller to:
indicate degradation of an electrical connector in response to a voltage output of the one or more piezoelectric devices; and
adjust operation of a vehicle to reduce fretting of the electrical connector in response to the voltage output of the one or more piezoelectric devices.

7. The vehicle system of claim 6, where adjusting operation of the vehicle to reduce fretting includes adjusting dampening of a vehicle suspension.

8. The vehicle system of claim 6, where adjusting operation of the vehicle to reduce fretting includes adjusting a frequency of rotation of a propulsive effort source.

9. The vehicle system of claim 6, where the first mass is a battery and the second mass is a vehicle chassis or suspension.

10. The vehicle system of claim 6, where the first mass is a vehicle chassis and the second mass is a vehicle suspension.

11. The vehicle system of claim 6, further comprising circuitry to interface the one or more piezoelectric devices to a battery.

12. The vehicle system of claim 11, where the battery supplies power to propel a vehicle.

13. A vehicle operating method, comprising:
supplying electric power from a piezoelectric device that is coupled to a first mass, the first mass insulated from a second mass;
operating one or more electric devices including a propulsion source with at least a portion of electric power supplied from the piezoelectric device; and
reducing the electrical output of the piezoelectric device and adjusting dampening of a suspension when the electrical output of the piezoelectric device exceeds a threshold.

14. The method of claim 13, further comprising indicating degradation of an electrical connector associated with the first mass in response to an electrical output of the piezoelectric device.

15. The method of claim 14, where the first mass is a battery and where the second mass is a vehicle suspension or chassis.

16. The method of claim 13, where the first mass is a vehicle chassis and where the second mass is a vehicle suspension.

* * * * *